US009824697B2

(12) United States Patent
Liu

(10) Patent No.: US 9,824,697 B2
(45) Date of Patent: Nov. 21, 2017

(54) NOISE ELIMINATION CIRCUIT

(71) Applicants: NANNING FUGUI PRECISION INDUSTRIAL CO., LTD., Nanning (CN); HON HAI PRECISION INDUSTRY CO., LTD., New Taipei (TW)

(72) Inventor: Lian Liu, Shenzhen (CN)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/191,932

(22) Filed: Jun. 24, 2016

(65) Prior Publication Data

US 2017/0025133 A1 Jan. 26, 2017

(30) Foreign Application Priority Data

Jul. 24, 2015 (CN) .......................... 2015 1 0442124

(51) Int. Cl.
*H04B 15/00* (2006.01)
*G10L 21/0224* (2013.01)
*G10L 21/0216* (2013.01)

(52) U.S. Cl.
CPC .................... *G10L 21/0224* (2013.01); *G10L 2021/02165* (2013.01)

(58) Field of Classification Search
CPC ....... G10L 2021/02165; G10L 21/0224; G10L 21/02; H04R 2430/01; H04R 3/00; H04S 2420/07; H04S 3/008; H04S 7/00
(Continued)

(56) References Cited

U.S. PATENT DOCUMENTS 6,061,456 A 5/2000 Andrea et al.
8,238,575 B2 * 8/2012 Buck ...................... G10L 25/78 381/71.11

(Continued)

FOREIGN PATENT DOCUMENTS

CN 103634439 A 3/2014

OTHER PUBLICATIONS

Walter G. Jung, OP Amp Application, Jul. 2002, Analog Devices, p. 2.3-2.5.*

*Primary Examiner* — Vivian Chin
*Assistant Examiner* — Friedrich W Fahnert
(74) *Attorney, Agent, or Firm* — ScienBiziP, P.C.

(57) ABSTRACT

A noise elimination circuit of particular application in enhancing vocal clarity in a teleconference includes a first voice processing circuit, a second voice processing circuit, and a subtracter. The first voice processing circuit receives and processes a first voice from a first microphone and the second voice processing circuit receives and processes the same voice from a second microphone (second voice). The first voice and the second voice include voice signals and noises. The subtracter is electrically connected to the two voice processing circuits to receive the first voice and the second voice respectively processed by the first voice processing circuit and the second voice processing circuit. The subtracter substracts the second voice from the first voice, and outputs a clear voice from which noise has been eliminated.

11 Claims, 5 Drawing Sheets

(58) Field of Classification Search
USPC ...... 381/94.7, 94.1, 71.8, 71.11, 71.1, 71.12, 381/122, 92, 71.7, 71.13, 97, 111; 455/73, 90; 330/250, 252
See application file for complete search history.

(56) References Cited

U.S. PATENT DOCUMENTS

| | | | | |
|---|---|---|---|---|
| 9,418,675 | B2 * | 8/2016 | Zhu | G10L 21/0208 |
| 9,570,062 | B2 * | 2/2017 | Wu | H04R 3/005 |
| 2002/0193130 | A1 * | 12/2002 | Yang | H04R 3/005 455/501 |

* cited by examiner

NOISE ELIMINATION CIRCUIT

FIELD

The subject matter herein generally belongs to audio communication fields, especially relates to a noise elimination circuit.

BACKGROUND

Various low frequency noises can be transmitted to other phones through microphone in a teleconference, these noises have adverse effect on the teleconference. This is particularly important when the participants of the teleconference are from different countries, when misunderstandings can easily occur.

SUMMARY

The present disclosure provides a noise elimination circuit which includes a first voice processing circuit, a second voice processing circuit, and a subtracter. The first voice processing circuit is configured to receive and process a first voice, the first voice includes a first voice signal and a first noise. The second voice processing circuit is configured to receive and process a second voice, the second voice includes a second voice signal and a second noise. The subtracter is coupled to the first voice processing circuit and the second voice processing circuit, and the subtracter is configured to receive the first voice and the second voice processed by the two processing circuits, and to subtract the two processed voices from each other and output a voice signal that has the noise reduced if not eliminated.

The noise elimination circuit provided by the present disclosure avoids interference by undesired noise and improves the user experience in the teleconference.

BRIEF DESCRIPTION OF THE DRAWINGS

Embodiments of the present technology will now be described, by way of example only, with reference to the attached figures, wherein.

DETAILED DESCRIPTION

Figure 1:
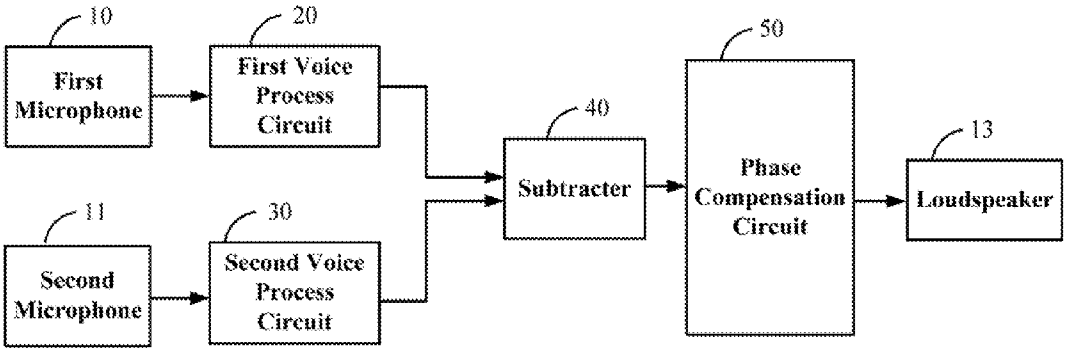
FIG. 1 is a schematic diagram of a noise elimination circuit according to an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 shows a noise elimination circuit according to an embodiment. The noise elimination circuit can apply to devices with several input interfaces, such as a conference telephone which has a plurality of user microphones.

In one embodiment, the noise elimination circuit includes a first voice processing circuit 20, a second voice processing circuit 30, and a subtracter 40. The first voice processing circuit 20 is electrically connected with a first microphone 10 and receives and processes a first voice from the first microphone 10. The second voice processing circuit 30 is electrically connected with a second microphone 11 and receives and processes a second voice from the second microphone 11. The first voice and the second voice can both include noise as well as voice signal.

After processing by the first voice processing circuit 20 and the second voice processing circuit 30, the first and second voices are transmitted to the subtracter 40 to do subtraction. Generally, the distance between the user and the first microphone 10 is different from the distance between the user and the second microphone 11, but the received noise levels are approximately the same. The subtracter 40 subtracts the second voice from the first voice and outputs the clarified voice signal.

In one embodiment, the noise elimination circuit further includes a phase compensation circuit 50. The phase compensation circuit 50 is electrically connected to the subtracter 40, the phase compensation circuit 50 adjusts the phase of the clarified voice signal before the voice is output to a loudspeaker 13.

Figure 2:
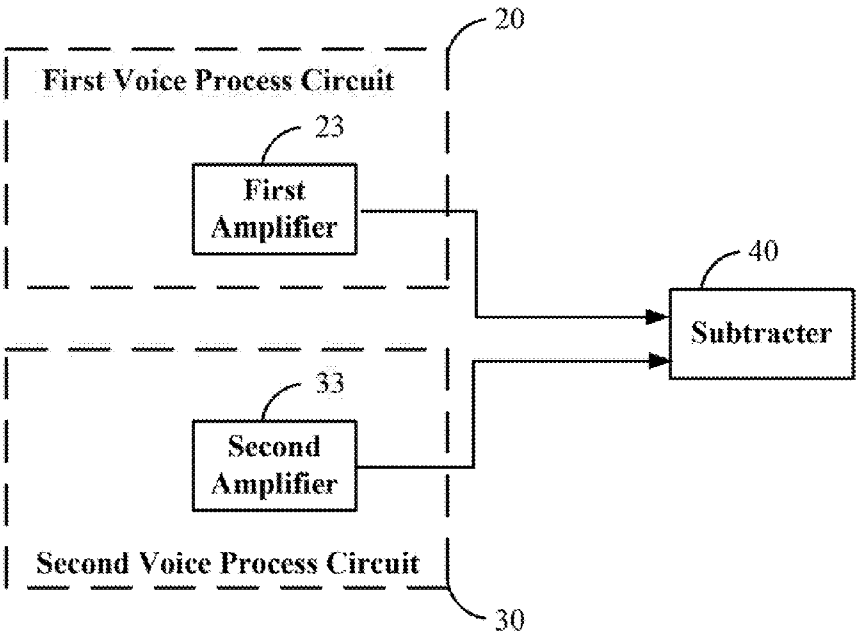
FIG. 2 is a schematic diagram of a first and a second voice processing circuit in the noise elimination circuit of FIG. 1.

FIG. 2 shows the first voice processing circuit 20 and the second voice processing circuit 30 according to an embodiment.

In one embodiment, the first voice processing circuit 20 and the second voice processing circuit 30 both include an amplifier. Each amplifier is configured to amplify and output the first voice and the second voice. In one embodiment, a first amplifier 23 is electrically connected to the first microphone 10 to receive the voice input from the microphone and amplify the received voice, and a second amplifier 33 is electrically connected to the second microphone 11 to receive the voice input from the microphone and amplify the received voice. The voice signals received by each amplifier are different in amplitude, but the received noises are approximately the same, so the difference between the voices in the two inputs becomes bigger. The amplified noises are approximately the same in each one of the two inputs, therefore, the voice signal can be extracted by the subtracter 40.

Figure 3:
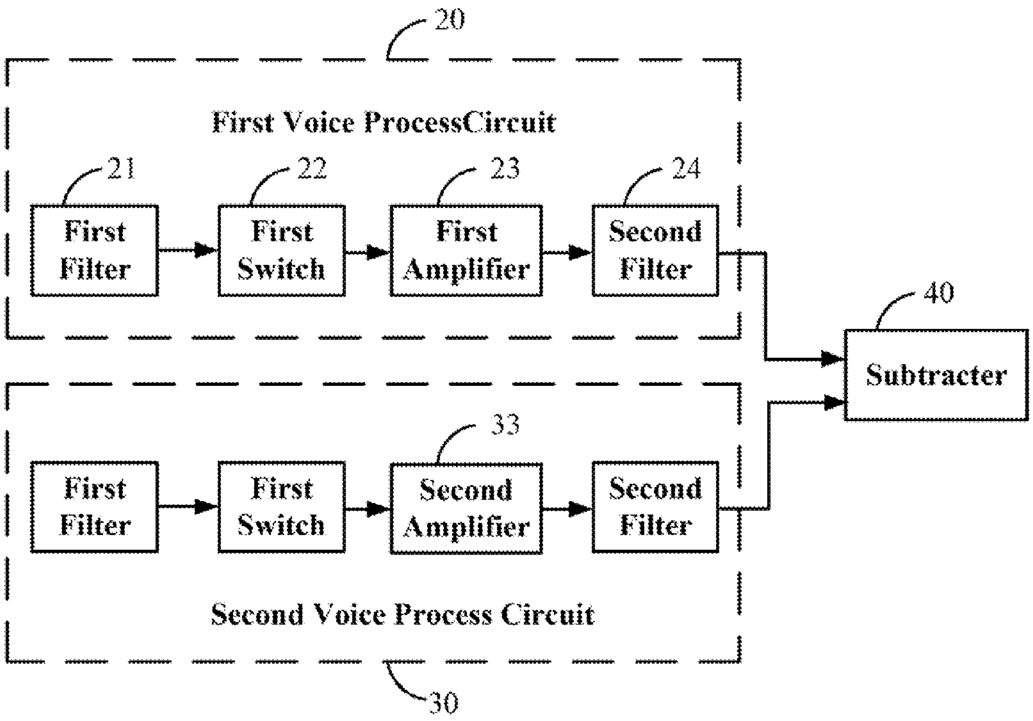
FIG. 3 is a schematic diagram of another embodiment of a first and a second voice processing circuit in the noise elimination circuit of FIG. 1.

FIG. 3 shows the first voice processing circuit 20 and the second voice processing circuit 30 according to another embodiment.

In one embodiment, the circuit construction of the first voice processing circuit 20 is the same as the circuit construction of the second voice processing circuit 30. Hereinafter the first voice processing circuit 20 is the example. The first voice processing circuit 20 further includes a first filter 21, a first switch 22, and a second filter 24.

The first filter 21 is configured to filter a part of noise of the first voice to reduce the impact to the first voice processing circuit 20. The first switch 22 is electrically connected between the first filter 21 output port and the amplifier 23 input port. The amplifier 23 input port is configured to control the first voice processing circuit 20 and turn on the first switch 22 to enable the first voice processing circuit 20. The second filter 24 is electrically connected to the amplifier 23 output port to apply a second filtering operation. In other embodiments, the first switch 22 can be removed so that the first filter 21 output port is directly connected to the amplifier 23 input port.

Then, the second filter 24 transmits the first voice, from which partial noises have been eliminated, to the subtracter 40. In other embodiments, voice processing devices like audio processing chip (APC) can be added to the first voice processing circuit 20 and the second voice processing circuit 30 to enhance voice processing.

Figure 4:
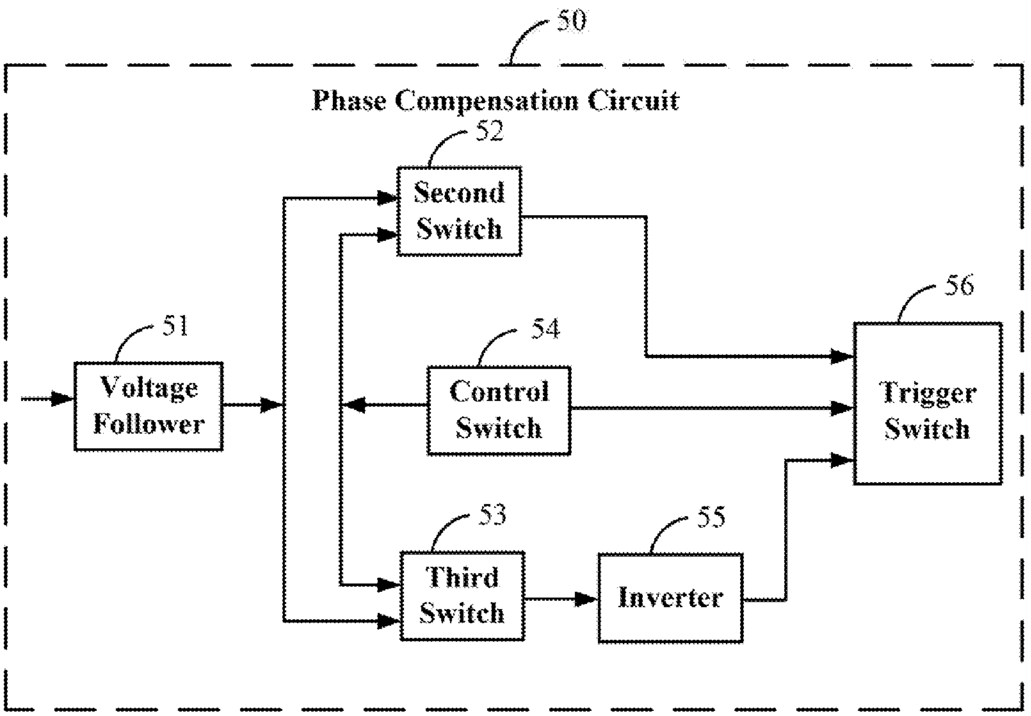
FIG. 4 is a schematic diagram of phase compensation circuit in the noise elimination circuit of FIG. 1.

FIG. 4 shows a phase compensation circuit 50 according to another embodiment of the disclosure.

The phase compensation circuit 50 includes a voltage follower 51, a control switch 54, a second switch 52, a third switch 53, a inverter 55, and a trigger switch 56. The voice signal from the subtracter 40 is transmitted to the voltage follower 51, then the voltage follower 51 outputs the voice signal to two branch circuits. The two branch circuits are controlled by the control switch 54, the control switch 54 outputs a control signal to turn on one of the branch circuits to transmit voice signal.

In one embodiment, the second switch 52 is set in the first branch circuit and is electrically connected with the voltage follower 51 and the control switch 54 to control the first branch circuit according to the control signal. The third switch 53 is set in the second branch circuit and is electrically connected with the voltage follower 51 and the control switch 54 to control the second branch circuit according to the control signal.

The inverter 55 is set in the second branch circuit to adjust the phase of the voice signal. In one embodiment, the inverter 55 applies 180 degrees adjustment of the phase of voice signal of the second branch circuit.

The trigger switch 56 is set in the phase compensation circuit 50 output port. The trigger switch 56 is electrically connected with the control switch 54, the first branch circuit, and the second branch circuit to control the connection of the phase compensation circuit 50 to the first branch circuit and the second branch circuit according to the control signal.

For example, the control switch 54 outputs a control signal to control the second switch 52, the third switch 53, and the trigger switch 56 according to the distance between the two microphones and the user. The second switch 52 is turned on, the third switch 53 is turned off, and the trigger switch 56 is electrically connected to the first branch circuit according to the control signal from the control switch 54 when the first microphone 10 is closer to the user. In this case, the voice signal is transmitted through the first branch circuit. In other circumstances, the third switch 53 is turned on, the second switch 52 is turned off, and the trigger switch 56 is electrically connected to the second branch circuit according to the control signal from the control switch 54 when the first microphone 10 is further from the user. In this case, the voice signal is transmitted through the second branch circuit and is outputted through the inverter 55. In some embodiments, the trigger switch 56 can be removed, that is to say, the first branch circuit output port and the second branch circuit output port are electrically connected to the phase compensation circuit 50 output port. When the switch of the branch circuit is turned on, the corresponding branch circuit will output relevant signal through the phase compensation circuit 50 output port.

In one embodiment, user can turn on or turn off the control switch 54 to generate the control signal according to the distances of the two microphones from the user. In other embodiments, the distances of the two microphones from the user can be detected by detection methods, such as ranging technique, so as to turn on or turn off the control switch 54 to generate the aforesaid control signal.

Figure 5:
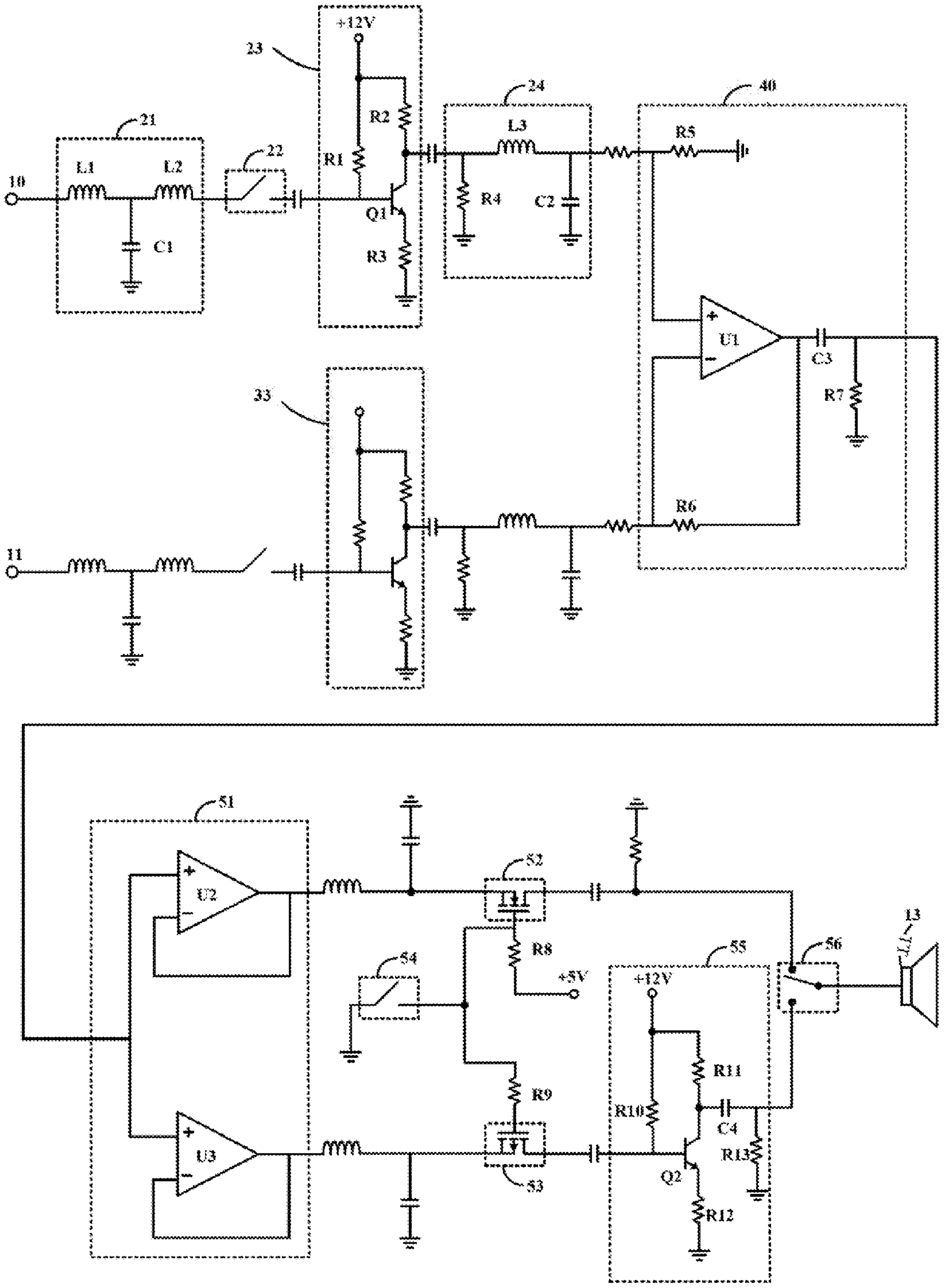
FIG. 5 is a schematic diagram of an embodiment of a noise elimination circuit.

FIG. 5 shows a noise elimination circuit according to an embodiment of the disclosure.

In one embodiment, the first filter 21 includes a first inductor, a second inductor, and a first capacitor. Wherein, the first inductor first end is the first filter 21 input port. The second inductor first end is electrically connected to the first inductor second end. The first capacitor C1 first end is electrically connected to the first inductor second end, and the first capacitor C1 second end is electrically connected to ground.

The amplifier 23 includes a first transistor Q1, and the first transistor Q1 base is electrically connected to the power source through a first resistor R1, the first transistor Q1 collector is electrically connected to the power source through a second resistor R2, and the first transistor Q1 emitter is electrically connected to ground through a third resistor R3. The power source can be a 12 volts direct current (DC) power.

The second filter 24 includes a third inductor and a second capacitor C2. Wherein the third inductor first end is the second filter 24 input port and is electrically connected to ground through a fourth resistor R4. The second capacitor C2 first end is electrically connected to the third inductor second end and the second capacitor C2 second end is electrically connected to ground.

The subtracter 40 includes a first integrated operational amplifier U1, the first integrated operational amplifier U1 first input port is electrically connected to ground through a fifth resistor R5 and is electrically connected to the first voice processing circuit 20 output port. The first integrated operational amplifier U1 second input port is electrically connected to the second voice processing circuit 30 output port and is electrically connected to the first integrated operational amplifier U1 output port through a sixth resistor R6, and the first integrated operational amplifier U1 output port is electrically connected to ground through a third capacitor C3 and a seventh resistor R7.

The voltage follower 51 includes a second integrated operational amplifier U2 and a third integrated operational amplifier U3. Wherein the second integrated operational amplifier U2 first input port is electrically connected to the integrated operational amplifier U2 output port. The third integrated operational amplifier U3 first input port is electrically connected to the third integrated operational amplifier U3 output port, and the third integrated operational amplifier U3 second input port is electrically connected to the second integrated operational amplifier U2 second input port.

The second switch 52 and the third switch 53 can be field effect transistors (FETs), the control switch 54 first end is electrically connected to the second switch 52 gate and is electrically connected to the power source through an eighth resistor R8 is also electrically connected to the third switch 53 gate through a ninth resistor R9, and the control switch 54 second end is electrically connected to ground. In one embodiment, the second switch 52 is an N-channel metal oxide semiconductor field effect transistor (NMOSFET) and the third switch 53 is a P-channel MOSFET. The power source can be a 5 volts DC bias power to ensure that only one of the second switch 52 and the third switch 53 is turned on when the control signal is received.

The inverter 55 includes a second transistor Q2. The second transistor Q2 base is electrically connected to the power source through a tenth resistor R10, and the second transistor Q2 collector is electrically connected to a fourth capacitor C4 as the inverter 55 output port. The second transistor Q2 collector is also electrically connected to the power source through an eleventh resistor R11, and the second transistor Q2 emitter is electrically connected to ground through a twelfth resistor R12. The power source herein is a 12 volts DC bias power.

In one embodiment, the subtracter 40 subtracts the second voice from the first voice, so the voice signal phase outputted from the subtracter 40 is the same as the phase of the user voice when the first microphone 10 is closer to the user, therefore it is not necessary to adjust the output voice phase. In this case, the control signal generated from the control switch 54 will turn on the second switch 52 but turn off the third switch 53, and the trigger switch 56 is electrically connected to the first branch circuit. The voice signal is transmitted and outputted in the first branch circuit.

In other circumstances, the phase of the voice signal from subtracter 40 and user voice phase are in reverse, so it is necessary to adjust the phase of the output voice signal. In this case, the third switch 53 will be turned on but the second switch 52 will be turned off according to the control signal from the control switch 54. The voice signal is transmitted in the second branch circuit, and the voice signal will be processed by the inverter 55 and the inverter 55 will output a voice signal having the same phase as the user's.

The noise elimination circuit avoids or reduces interference by undesired noises in a teleconference, and improves the user experience.

The foregoing description, for purposes of explanation, has been described with reference to specific embodiments. However, the illustrative discussion above are not intended to be exhaustive or to limit the disclosure to the precise forms disclosed. Many modifications and variations are possible in view of the above teachings. The various modifications from the principles of the disclosure are therefore included and protected within the scope of the claims.

What is claimed is:

1. A noise elimination circuit, comprising:

a first voice processing circuit, configured to receive and process a first voice from a first microphone, and the first voice comprises a first voice signal and a first noise;

a second voice processing circuit, configured to receive and process a second voice from a second microphone, and the second voice comprises a second voice signal and a second noise;

a subtracter, coupled to the first voice processing circuit and the second voice processing circuit, configured to receive the first voice and the second voice processed by the first voice processing circuit and the second voice processing circuit, and to subtract the second voice from the first voice to output a voice signal without noises; and a phase compensation circuit coupled to the subtracter, configured to adjust voice phase and to output the voice signal without noises; wherein the phase compensation circuit comprises:

a voltage follower;

a voltage input port coupled to a subtracter output port;

a control switch, configured to output a control signal;

a first branch circuit, coupled to a voltage follower output port and the control switch; and a second branch circuit, coupled to the voltage follower output port and the control switch.

2. The noise elimination circuit of claim 1, wherein the subtracter comprises a first integrated operational amplifier, having a first input port coupled to a first voice processing circuit output port; and having a second input port coupled to a second voice processing circuit output port and a first integrated operational amplifier output port.

3. The noise elimination circuit of claim 1, wherein the first voice processing circuit and the second voice processing circuit both comprise an amplifier; and each amplifier is configured to amplify and output the first voice and the second voice respectively.

4. The noise elimination circuit of claim 3, wherein each amplifier comprises a first transistor, a first transistor base and a first transistor collector electrically connected to a direct current (DC) bias power source, and a first transistor emitter is coupled to ground.

5. The noise elimination circuit of claim 3, wherein the first voice processing circuit and the second voice processing circuit further comprise:

a first filter, configured to receive voices from a corresponding microphone and to filter noises; and a second filter, coupled to a amplifier output port, is configured to apply a second filtering operation.

6. The noise elimination circuit of claim 1, wherein the voltage follower comprising:

a second integrated operational amplifier, and a second integrated operational amplifier first input port coupled to a second integrated operational amplifier output port; and a second integrated operational second input port coupled to the subtracter output port; and a third integrated operational amplifier, a third integrated operational amplifier first input port coupled to a third integrated operational amplifier output port; and a third integrated operational amplifier second input port coupled to a second integrated operational amplifier second input port.

7. The noise elimination circuit of claim 1, wherein the phase compensation circuit further comprises a trigger switch; and the trigger switch coupled to the control switch, is configured to control the phase compensation circuit output port being coupled to the first branch circuit and to the second branch circuit according to the control signal.

8. The noise elimination circuit of claim 1, wherein the first branch circuit comprises:

a second switch, coupled to the control switch, is configured to enable the first branch circuit according to the control signal;

the second branch circuit comprises:

a third switch, coupled to the control switch, and the third switch is configured to enable the second branch circuit according to the control signal; and an inverter, coupled to the third switch, and the inverter is configured to adjust voice phase.

9. The noise elimination circuit of claim 8, wherein the inverter comprises a second transistor; and a second transistor base and a second transistor collector that are both coupled to the DC bias power source, and a second transistor emitter is coupled to ground.

10. The noise elimination circuit of claim 8, wherein the second switch and the third switch both are Field Effect Transistors; and a control switch first end coupled to a second switch gate and a third switch gate, and a control switch second end coupled to ground.

11. The noise elimination circuit of claim 8, wherein when the second switch is turned on, the third switch is turned off; and when the third switch is turned on, the second switch is turned off.

* * * * *